(12) United States Patent
Chen et al.

(10) Patent No.: US 12,032,246 B2
(45) Date of Patent: Jul. 9, 2024

(54) PIXEL UNIT

(71) Applicant: TCL China Star Optoelectronics Technology Co., Ltd., Guangdong (CN)

(72) Inventors: Mei Chen, Guangdong (CN); Xingwu Chen, Guangdong (CN); Qi Song, Guangdong (CN); Dongze Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/297,011

(22) PCT Filed: Apr. 20, 2021

(86) PCT No.: PCT/CN2021/088398
§ 371 (c)(1),
(2) Date: May 26, 2021

(87) PCT Pub. No.: WO2022/217629
PCT Pub. Date: Oct. 20, 2022

(65) Prior Publication Data
US 2024/0012297 A1 Jan. 11, 2024

(30) Foreign Application Priority Data
Apr. 12, 2021 (CN) .......................... 202110390069.X

(51) Int. Cl.
*G02F 1/1343* (2006.01)
*G02F 1/1337* (2006.01)

(52) U.S. Cl.
CPC .. *G02F 1/134345* (2021.01); *G02F 1/133707* (2013.01)

(58) Field of Classification Search
CPC ............ G02F 1/1343; G02F 1/134309; G02F 1/134327; G02F 1/134336; G02F 1/134345; G02F 1/134354; G02F 1/133707
See application file for complete search history.

(56) References Cited

U.S. PATENT DOCUMENTS

2012/0050641 A1 3/2012 Chen et al.
2021/0364866 A1* 11/2021 Cao ................... G02F 1/133707

FOREIGN PATENT DOCUMENTS

| CN | 104483779 | | 4/2015 | |
| CN | 107329334 | | 11/2017 | |
| CN | 208999730 | | 6/2019 | |
| CN | 110673405 | | 1/2020 | |
| CN | 110703517 | | 1/2020 | |
| CN | 111025790 | | 4/2020 | |
| CN | 111352279 | | 6/2020 | |
| CN | 111443527 | | 7/2020 | |
| CN | 111443527 A | * | 7/2020 | ....... G02F 1/133707 |

* cited by examiner

*Primary Examiner* — Jia X Pan

(57) ABSTRACT

The present disclosure provides a pixel unit, wherein a first sub-pixel electrode trunk, a second sub-pixel electrode trunk, and a sub-pixel frame electrode divide a sub-pixel area into a first partition, a second partition, a third partition, and a fourth partition; the fourth partition is provided with a fourth sub-pixel electrode branch, the fourth partition is located in a lower right area of the sub-pixel area, and an included angle between the fourth sub-pixel electrode branch and a left side of a lower frame electrode of the sub-pixel frame electrode is an obtuse angle.

5 Claims, 7 Drawing Sheets

PIXEL UNIT

RELATED APPLICATIONS

This application is a National Phase of PCT Patent Application No. PCT/CN2021/088398 having International filing date of Apr. 20, 2021, which claims the benefit of priority of Chinese Patent Application No. 202110390069.X filed on Apr. 12, 2021. The contents of the above applications are all incorporated by reference as if fully set forth herein in their entirety.

FIELD AND BACKGROUND OF THE INVENTION

The present disclosure relates to the field of display technology, in particular to a pixel unit.

Vertically aligned liquid crystal (VA) liquid crystal displays are widely used in display fields such as televisions and monitors due to their outstanding high contrast. With the development of large-sized liquid crystal displays with high-resolution, in order to further increase bright state transmittance of the VA liquid crystal displays, chiral multi-domain vertical alignment (Chiral VA) liquid crystal displays have gradually developed.

In a chiral multi-domain vertical alignment (Chiral VA) liquid crystal display, chiral compounds are added into negative nematic matrix liquid crystals to make liquid crystal molecules switch reversibly between a vertical alignment state (dark state) and a plane twisted state (bright state). On the one hand, the chiral multi-domain vertical alignment mode uses optical rotation and birefringence to reduce wavelength dependence and suppress chromatic dispersion; and on the other hand, in the chiral multi-domain vertical alignment mode, the liquid crystal molecules are tilted in all directions under a power-on condition, which can effectively reduce dark lines between domains, so as to achieve improved transmittance. However, in order to meet the maximum transmittance design, included angles between branches and trunks of a pixel electrode pattern of the chiral multi-domain vertical alignment mode are not uniform, and generally not 45°.

As shown in FIG. 1, during curing for a high resolution vertical alignment (HVA), studies found that concentrated dark lines 11 are present in a bottom area of a low-potential sub-area where an included angle 10 between a branch 13 and a trunk 12 is small.

In view of the above background, there is a need to propose a new pixel unit in which a large angle design is introduced into a boundary area between the pixel electrode branches and the pixel electrode trunk in the sub-area.

SUMMARY OF THE INVENTION

A first object of the present disclosure is to provide a pixel unit which adopts a large angle design in an included angle between a fourth sub-pixel electrode branch and a left side of a lower frame electrode of a sub-pixel frame electrode to prevent concentrated dark lines in a bottom area of a sub-pixel area.

The present disclosure provides a pixel unit including a main pixel area and a sub-pixel area, wherein the main pixel area includes a main pixel electrode, and the sub-pixel area includes: a sub-pixel electrode having at least one domain, wherein the sub-pixel electrode includes: a sub-pixel frame electrode disposed at an edge of the sub-pixel electrode; a first sub-pixel electrode trunk and the second sub-pixel electrode trunk that are perpendicular to each other; and a plurality of sub-pixel electrode branches extending from the first sub-pixel electrode trunk and the second sub-pixel electrode trunk to the sub-pixel frame electrode; and the sub-pixel electrode branches include a first sub-pixel electrode branch, a second sub-pixel electrode branch, a third sub-pixel electrode branch, and a fourth sub-pixel electrode branch, wherein the first sub-pixel electrode trunk, the second sub-pixel electrode trunk, and the sub-pixel frame electrode divide the sub-pixel area into a first partition, a second partition, a third partition, and a fourth partition; the first partition is provided with the first sub-pixel electrode branch, the second partition is provided with the second sub-pixel electrode branch, the third partition is provided with the third sub-pixel electrode branch, and the fourth partition is provided with the fourth sub-pixel electrode branch, the fourth partition is located in a lower right area of the sub-pixel area; and an included angle between the fourth sub-pixel electrode branch and a left side of a lower frame electrode of the sub-pixel frame electrode is an obtuse angle.

Further, the obtuse angle ranges from 90 degrees to 120 degrees.

Further, the fourth sub-pixel electrode branch and the third sub-pixel electrode branch are arranged parallel to each other.

Further, the first sub-pixel electrode branch and the second sub-pixel electrode branch are perpendicular to each other; and the second sub-pixel electrode branch and the third sub-pixel electrode branch are parallel to each other.

Further, the first sub-pixel electrode branch and the second sub-pixel electrode branch are perpendicular to each other; and the first sub-pixel electrode branch and the third sub-pixel electrode branch are parallel to each other.

Further, the first sub-pixel electrode branch and the second sub-pixel electrode branch are parallel to each other; and the first sub-pixel electrode branch and the third sub-pixel electrode branch are parallel to each other.

Further, the first sub-pixel electrode branch and the second sub-pixel electrode branch are parallel to each other; and the first sub-pixel electrode branch and the third sub-pixel electrode branch are perpendicular to each other.

Further, the main pixel electrode includes: a main pixel frame electrode disposed at an edge of the main pixel electrode; a first main pixel electrode trunk and a second main pixel electrode trunk that are orthogonal to each other; and a plurality of main pixel electrode branches extending from the first main pixel electrode trunk and the second main pixel electrode trunk to the main pixel frame electrode, wherein the first main pixel electrode trunk and the second main pixel electrode trunk and the main pixel frame electrode divide the main pixel electrode into a first partition, a second partition, a third partition, and a fourth partition; the first partition is provided with a first main pixel electrode branch, the second partition is provided with a second main pixel electrode branch, the third partition is provided with a third main pixel electrode branch, and the fourth partition is provided with a fourth main pixel electrode branch; the first main pixel electrode branch and the second main pixel electrode branch are perpendicular to each other; the third main pixel electrode branch and the fourth main pixel electrode branch are perpendicular to each other; the first main pixel electrode branch and the third main pixel electrode branch are perpendicular to each other; and the second main pixel electrode branch and the fourth main pixel electrode branch are perpendicular to each other.

The present disclosure also provides a pixel unit including a main pixel area and a sub-pixel area surrounding the main pixel area, wherein the main pixel area includes a main pixel electrode, the main pixel electrode includes a first main pixel electrode trunk and second main pixel electrode trunk that are orthogonal to each other, and the sub-pixel area includes: a sub-pixel electrode, wherein the main pixel electrode is embedded in the sub-pixel electrode; and the sub-pixel electrode includes a sub-pixel frame electrode disposed at an edge of the sub-pixel electrode; and a plurality of sub-pixel electrode branches, wherein a shaped slit is provided between the main pixel electrode and the sub-pixel electrode; wherein the first main pixel electrode trunk and the second main pixel electrode trunk divide the sub-pixel electrode and the sub-pixel area into a first partition, a second partition, a third partition, and a fourth partition, the first partition is provided with a first sub-pixel electrode branch, the second partition is provided with a second sub-pixel electrode branch, the third partition is provided with a third sub-pixel electrode branch, and the fourth partition is provided with a fourth sub-pixel electrode branch; the fourth partition is located in a lower right area of the pixel unit, and an included angle between the fourth sub-pixel electrode branch and a left side of a lower frame electrode of the sub-pixel frame electrode is an obtuse angle.

Further, the obtuse angle ranges from 90 degrees to 120 degrees.

The present disclosure proposes a pixel electrode which adopts a large angle design in an included angle between a fourth sub-pixel electrode branch and a left side of a lower frame electrode of a sub-pixel frame electrode to prevent concentrated dark lines in a bottom area of a sub-pixel area.

BRIEF DESCRIPTION OF THE SEVERAL VIEWS OF THE DRAWINGS

The present disclosure will be further described below in conjunction with the drawings and embodiments.

DESCRIPTION OF SPECIFIC EMBODIMENTS OF THE INVENTION

Figure 1:
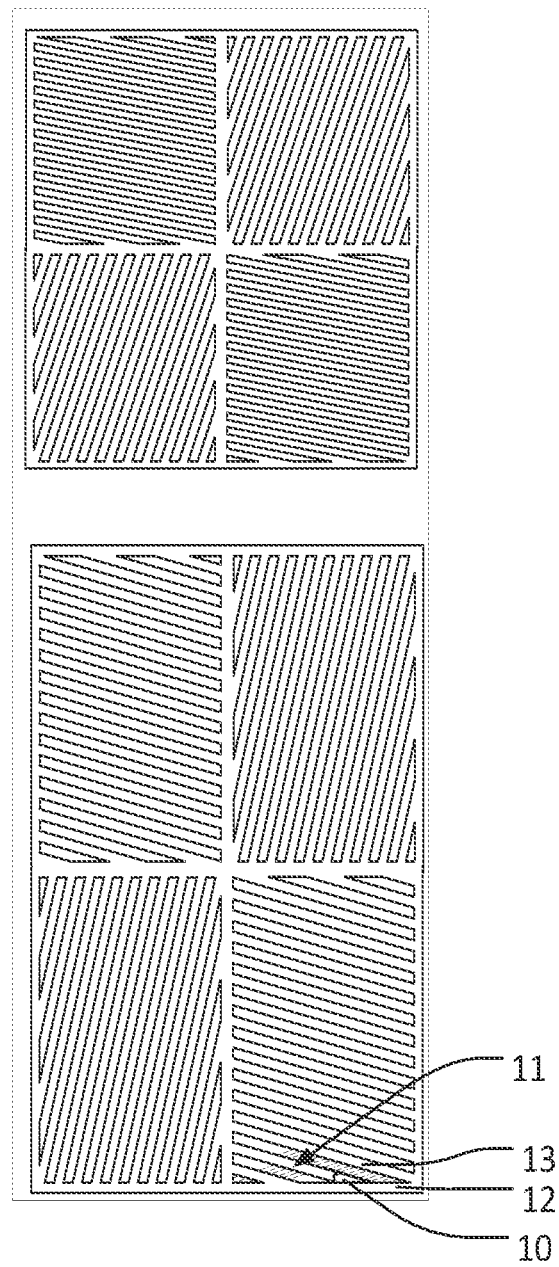
FIG. 1 is a schematic plan view of a pixel electrode provided by the prior art.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

Figure 2:
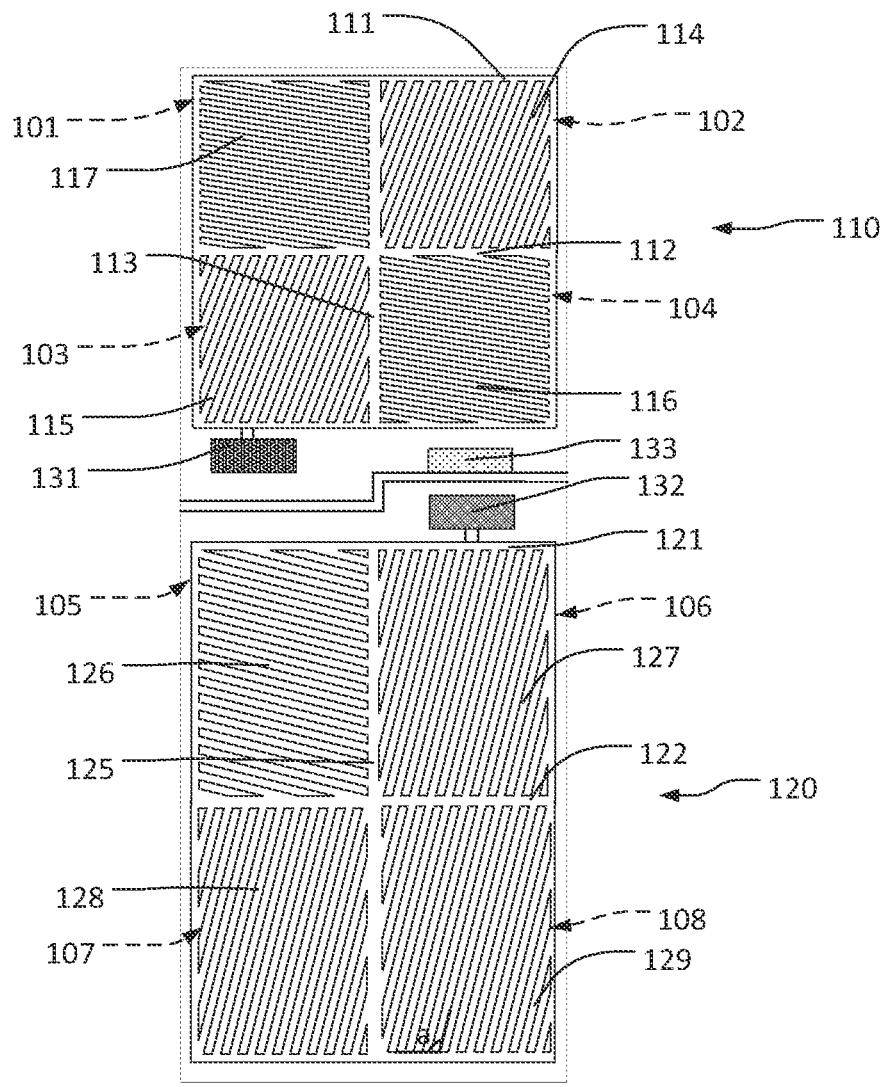
FIG. 2 is a schematic plan view of a pixel unit provided by Embodiment 1 of the present disclosure.

As shown in FIG. 2, Embodiment 1 of the present disclosure provides a pixel unit 100 including a main pixel electrode 110 located in a main pixel area and a sub-pixel electrode 120 located in a sub-pixel area.

The main pixel electrode 110 includes: a main pixel frame electrode 111, a first main pixel electrode trunk 112, a second main pixel electrode trunk 113, and main pixel electrode branches 114, 115, 116, 117, as shown in FIG. 2.

The first main pixel electrode trunk 112 and the second main pixel electrode trunk 113 are orthogonal to each other. The main pixel electrode branches extend from the first main pixel electrode trunk 112 and the second main pixel electrode trunk 113 to the main pixel frame electrode 111.

The first main pixel electrode trunk 112, the second main pixel electrode trunk 113, and the main pixel frame electrode 111 divide the main pixel area into a first partition 101, a second partition 102, a third partition 103, and a fourth partition 104. A plurality of first main pixel electrode branches 117 parallel to each other are provided in the first partition 101, a plurality of second main pixel electrode branches 114 parallel to each other are provided in the second partition 102, a plurality of third main pixel electrode branches 115 that are parallel to each other are provided in the third partition 103, and a plurality of fourth main pixel electrode branches 116 that are parallel to each other are provided in the fourth partition 104. The first partition 101, the second partition 102, the third partition 103, and the fourth partition 104 are arranged in an array, the first partition 101 is located in an upper left area of the main pixel area, the second partition 102 is located in an upper right area of the main pixel area, the third partition 103 is located in a lower left area of the main pixel area, and the fourth partition 104 is located in a lower right area of the main pixel area.

The main pixel frame electrode 111 is located at the edge of the main pixel electrode 110 and surrounds the main pixel electrode 110. A material of the main pixel electrode 110 is indium tin oxide.

The first main pixel electrode branch 117 and the second main pixel electrode branch 114 are perpendicular to each other; and the third main pixel electrode branch 115 and the fourth main pixel electrode branch 116 are perpendicular to each other. The first main pixel electrode branch 117 and the third main pixel electrode branch 115 are perpendicular to each other, and the second main pixel electrode branch 114 and the fourth main pixel electrode branch 116 are perpendicular to each other. The first main pixel electrode branch 117 and the fourth main pixel electrode branch 116 are parallel to each other, and the second main pixel electrode branch 114 and the third main pixel electrode branch 115 are parallel to each other.

The main pixel electrode 110 includes four display domains.

The sub-pixel electrode 120 includes: a sub-pixel frame electrode 121, a first sub-pixel electrode trunk 122, a second sub-pixel electrode trunk 125, and sub-pixel electrode branches 126, 127, 128, 129, as shown in FIG. 2.

The sub-pixel frame electrode 121 surrounds the sub-pixel electrode branches. The sub-pixel electrode branches extend from the first sub-pixel electrode trunk 122 and the second sub-pixel electrode trunk 125 to the sub-pixel frame electrode 121. A material of the sub-pixel electrode 120 is indium tin oxide.

The first sub-pixel electrode trunk 122, the second sub-pixel electrode trunk 125, and the sub-pixel frame electrode 121 divide the sub-pixel electrode into a first partition 105, a second partition 106, a third partition 107, and a fourth partition 108. A plurality of first sub-pixel electrode branches 126 parallel to each other are provided in the first partition 105, a plurality of second sub-pixel electrode branches 127 parallel to each other are provided in the second partition 106, a plurality of third sub-pixel electrode branches 128 parallel to each other are provided in the third partition 107, and a plurality of fourth sub-pixel electrode branches 129 parallel to each other are provided in the fourth partition 108. An included angle between the fourth sub-pixel electrode branch 129 and a left side of a lower frame electrode of the sub-pixel frame electrode 121 is an obtuse angle. The obtuse angle ranges from 90 degrees to 120 degrees. The first partition 105 is located in an upper left area of the sub-pixel area, the second partition 106 is located in an upper right area of the sub-pixel area, the third partition 107 is located in a lower left area of the sub-pixel area, and the fourth partition 108 is located in a lower right area of the sub-pixel area.

In Embodiment 1, the first sub-pixel electrode branch 126 and the second sub-pixel electrode branch 127 are perpendicular to each other. The first sub-pixel electrode branch 126 is perpendicular to the third sub-pixel electrode branch 128, and the second sub-pixel electrode branch 127 is parallel to the third sub-pixel electrode branch 128.

Electrode directions of the second sub-pixel electrode branch 127, the third sub-pixel electrode branch 128, and the fourth sub-pixel electrode branch 129 are the same. The third sub-pixel electrode branch 128 is parallel to the fourth sub-pixel electrode branch 129.

The sub-pixel electrode 120 includes three display domains. The first partition 105 is one display domain, the second partition 106 is another one display domain, and the third partition 107 and the fourth partition 108 are yet another one display domain. Deflection directions of the pixel electrode branches in the third partition 107 and the fourth partition 108 are the same.

In one embodiment, between the main pixel area and the sub-pixel area, the pixel unit 100 is further provided with a thin film transistor area, and the thin film transistor area includes: a main pixel area thin film transistor 131, a sub-pixel area thin film transistor 132, and a shared thin film transistor 133. The main pixel area thin film transistor 131 is connected to the main pixel electrode 110 to control the main pixel electrode 110; the sub-pixel area thin film transistor 132 is connected to the sub-pixel electrode 120 to control the sub-pixel electrode 120. The shared thin film transistor 133 is connected to a scan line to control a voltage difference between the main pixel electrode 110 and the sub-pixel electrode 120.

Figure 3:
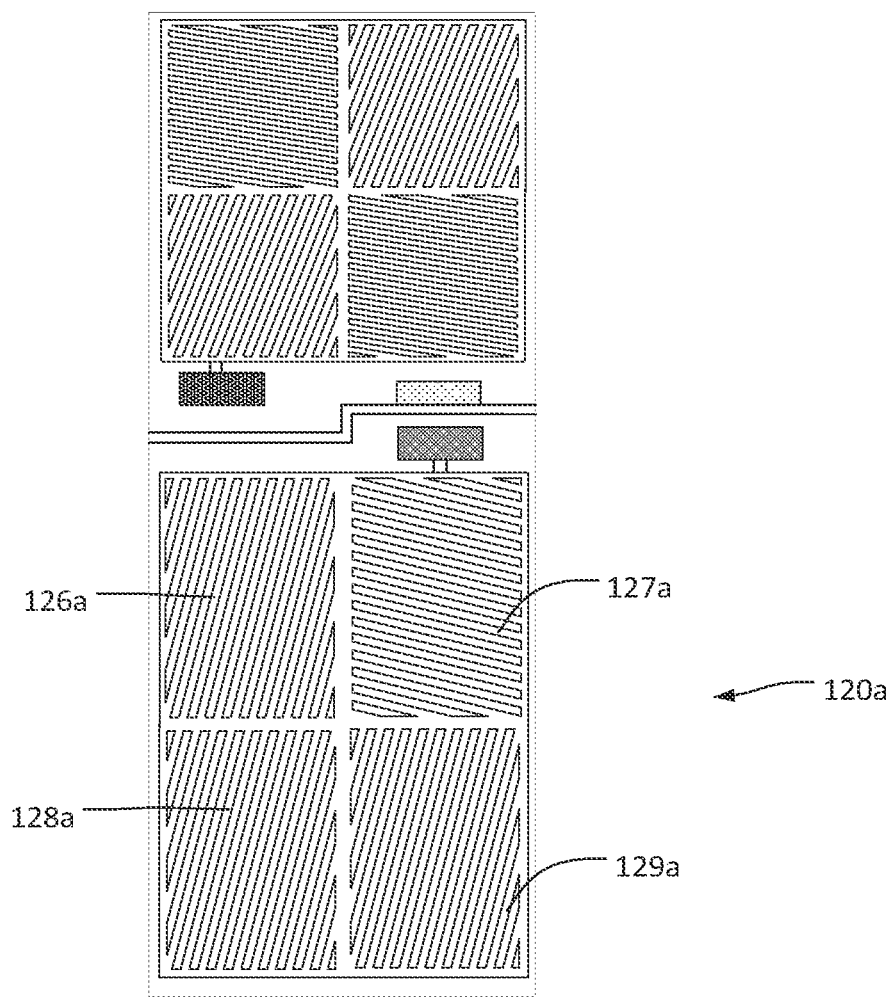
FIG. 3 is a schematic plan view of a pixel unit provided by Embodiment 2 of the present disclosure.

As shown in FIG. 3, Embodiment 2 of the present disclosure provides a pixel unit 100a. The difference from the first embodiment is that the sub-pixel electrode 120a has a different pattern structure. Specifically, the first sub-pixel electrode branch 126a and the third sub-pixel electrode branch 128a are parallel to each other, the second sub-pixel electrode branch 127a is perpendicular to the fourth sub-pixel electrode branch 129a, and the fourth sub-pixel electrode branch 129a and the third sub-pixel electrode branch 128a are parallel to each other.

Electrode directions of the first sub-pixel electrode branch 126a, the third sub-pixel electrode branch 128a, and the fourth sub-pixel electrode branch 129a are the same.

Figure 4:
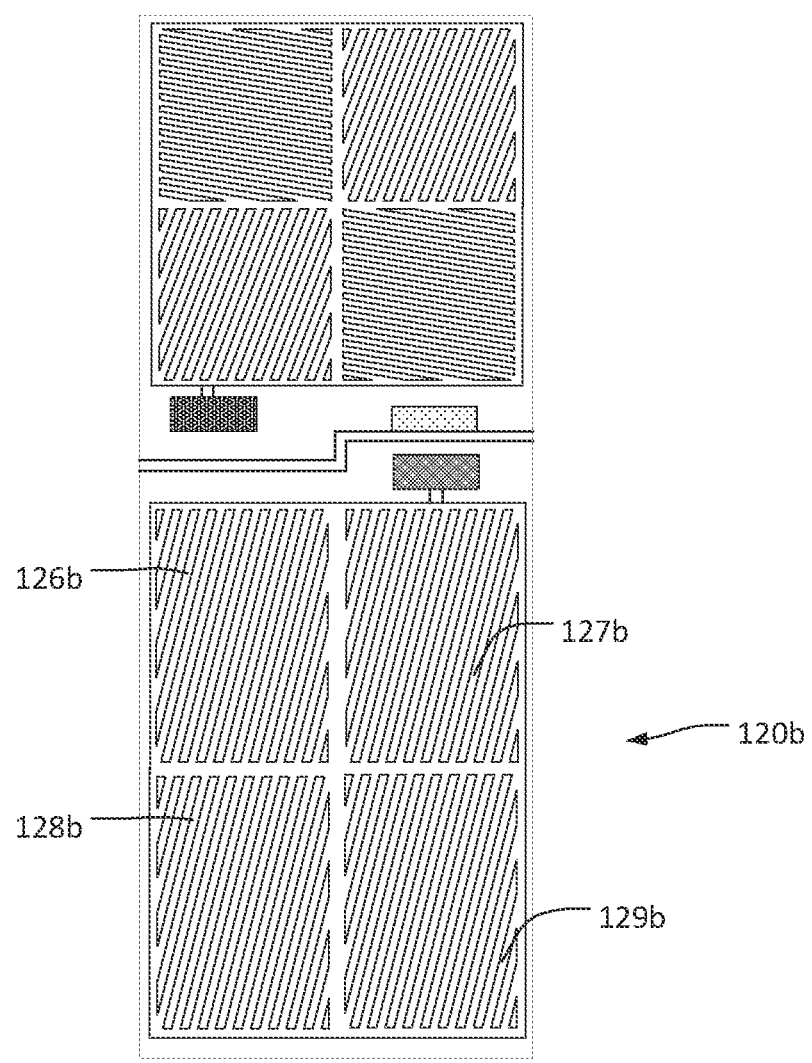
FIG. 4 is a schematic plan view of a pixel unit provided by Embodiment 3 of the present disclosure.

As shown in FIG. 4, Embodiment 3 of the present disclosure provides a pixel unit 100b. The difference from Embodiment 1 is that the sub-pixel electrode 120b has a different structure. Specifically, the first sub-pixel electrode branch 126b and the third sub-pixel electrode branch 128b are parallel to each other, the second sub-pixel electrode branch 127b and the fourth sub-pixel electrode branch 129b in the sub-pixel area are parallel to each other, and the first sub-pixel electrode branch 126b and the second sub-pixel electrode branch 127b are parallel to each other.

Electrode biases of the first sub-pixel electrode branch 126b, the second sub-pixel electrode branch 127b, the third sub-pixel electrode branch 128b, and the fourth sub-pixel electrode branch 129b are all the same.

The sub-pixel electrode 120b has one display domain, and the entire pixel unit 100b has 5 display domains.

Figure 5:
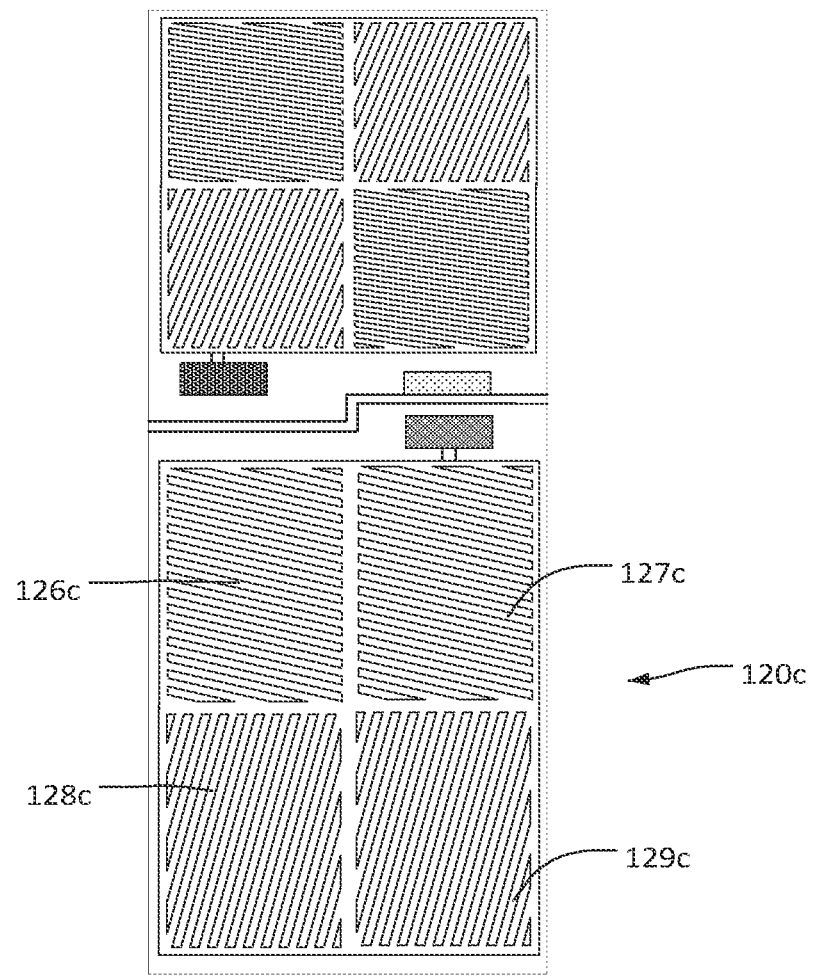
FIG. 5 is a schematic plan view of a pixel unit provided by Embodiment 4 of the present disclosure.

As shown in FIG. 5, Embodiment 4 of the present disclosure provides a pixel unit 100c. The difference from Embodiment 1 is that the sub-pixel electrode 120c has a different structure. Specifically, the first sub-pixel electrode branch 126c and the third sub-pixel electrode branch 128c are perpendicular to each other, the second sub-pixel electrode branch 127c and the fourth sub-pixel electrode branch 129c are perpendicular to each other, and the first sub-pixel electrode branch 126c and the second sub-pixel electrode branch 127c are parallel to each other.

Electrode biases of the first sub-pixel electrode branch 126c and the second sub-pixel electrode branch 127c are the same. The sub-pixel area 120c has two display domains.

In Embodiments 1-4, the first partition 105, the second partition 106, the third partition 107, the fourth partition 108, the first partition 101, the second partition 102, the third partition 103, and the fourth partition 104 are all regular square areas. In addition, in Embodiments 1-4, electrode bias of the partitions of the main pixel area are not limited, that is, the positional relationship between the first main pixel electrode branch 117, the second main pixel electrode branch 114, the third main pixel electrode branch 115, and the fourth main pixel electrode branches 116 are not defined, since it does not affect the inventive point of the present disclosure.

Figure 6:
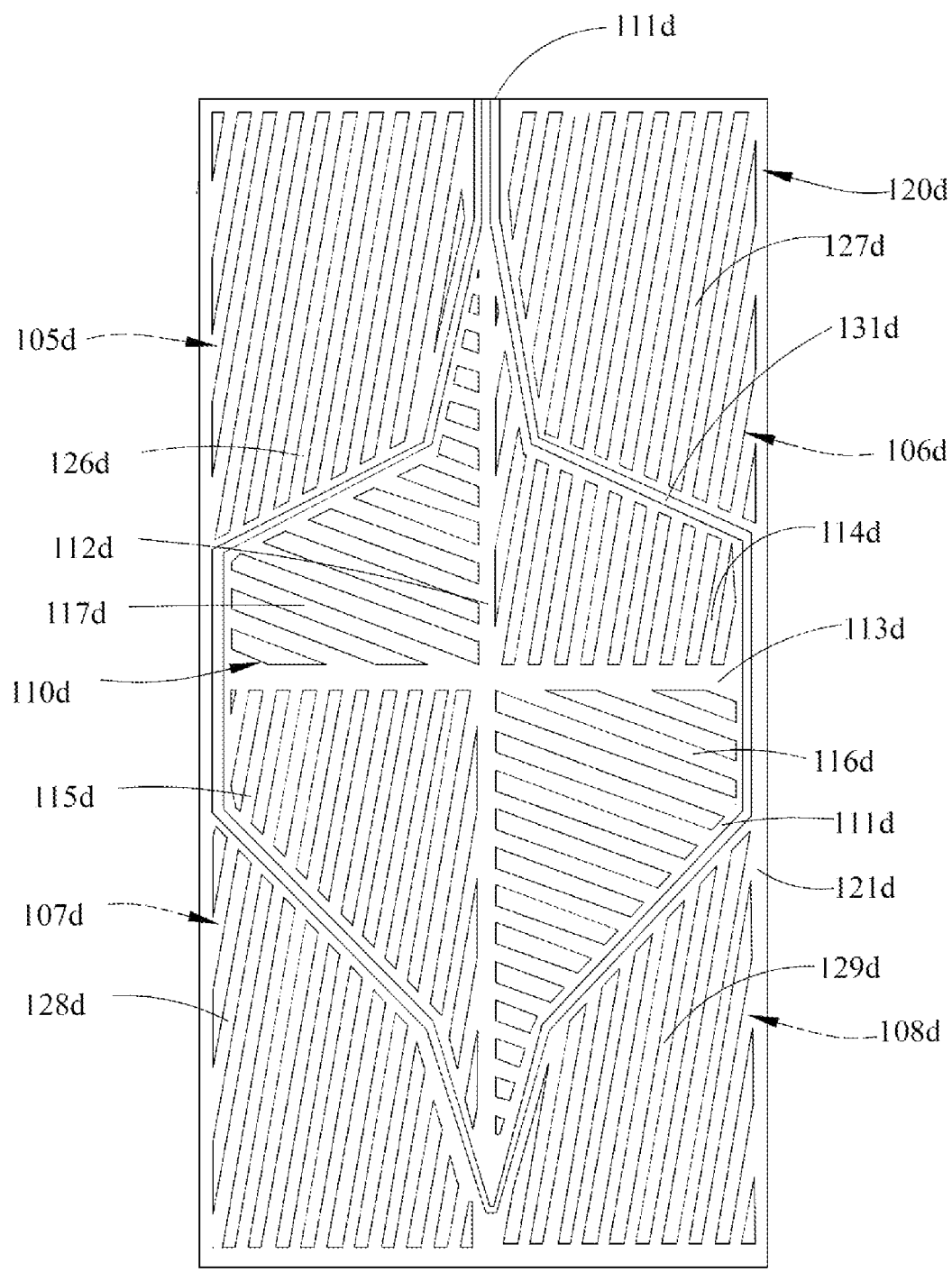
FIG. 6 is a schematic plan view of a pixel unit provided by Embodiment 5 of the present disclosure.

As shown in FIG. 6, Embodiment 5 of the present disclosure provides a pixel unit 100d. The difference from Embodiment 1 is that the sub-pixel electrode 120d substantially encloses the main pixel electrode 110d. That is, the sub-pixel area surrounds the main pixel area.

The first main pixel electrode trunk 112d and the second main pixel electrode trunk 113d divide the sub-pixel area and the main pixel area into a first partition 105d, a second partition 106d, a third partition 107d, and a fourth partition 108d. The fourth partition 108d is located in a lower right area of the sub-pixel area and the main pixel area, the first partition 105d is located in an upper left area of the sub-pixel area and the main pixel area, the second partition 106d is located in an upper right area of the sub-pixel area and the main pixel area, and the third partition 107d is located in a lower left area of the sub-pixel area and the main pixel area.

A main pixel frame electrode 111d, a sub-pixel frame electrode 121d, and a shaped slit 131d divide the main pixel electrode 110d. The shaped slit 131d is provided between the main pixel frame electrode 111d and the sub-pixel frame electrode 121d.

The first sub-pixel electrode branch 126d and the first main pixel electrode branch 117d are arranged in the first partition 105d. The second sub-pixel electrode branch 127d and the second main pixel electrode branch 114d are arranged in the first partition 106d. The third sub-pixel electrode branch 128d and the third main pixel electrode branch 115d are arranged in the third partition 107d. The fourth sub-pixel electrode branch 129d and the fourth main pixel electrode branch 116d are arranged in the fourth partition 108d.

The first main pixel electrode branch 117d and the second main pixel electrode branch 114d are perpendicular to each other; the third main pixel electrode branch 115d and the fourth main pixel electrode branch 116d are perpendicular to each other; the first main pixel electrode branch 117d and the third main pixel electrode branch 115d are perpendicular to each other; and the second main pixel electrode branch 114d and the fourth main pixel electrode branch 116d are perpendicular to each other. The first main pixel electrode branch 117d and the fourth main pixel electrode branch 116d are parallel to each other, and the second main pixel electrode branch 114d and the third main pixel electrode branch 115d are parallel to each other.

The first sub-pixel electrode branch 126d and the third sub-pixel electrode branch 128d are parallel to each other. The second sub-pixel electrode branch 127d and the fourth sub-pixel electrode branch 129d are parallel to each other. The first sub-pixel electrode branch 126d and the second sub-pixel electrode branch 127d are parallel to each other. Electrode biases of the first sub-pixel electrode branch 126d, the second sub-pixel electrode branch 127d, the third sub-pixel electrode branch 128d, and the fourth sub-pixel electrode branch 129d are all the same. The sub-pixel area has one display domain.

The present disclosure provides a pixel unit 100, 100a, 100b, 100c, or 100d, which adopts a large angle design in an included angle between a fourth sub-pixel electrode branch and a left side of a lower frame electrode of a sub-pixel frame electrode, wherein the angle ranges from 90 degrees to 120 degrees, so that concentrated dark lines in the bottom area of the sub-pixel electrode 120 can be prevented.

Figure 7:
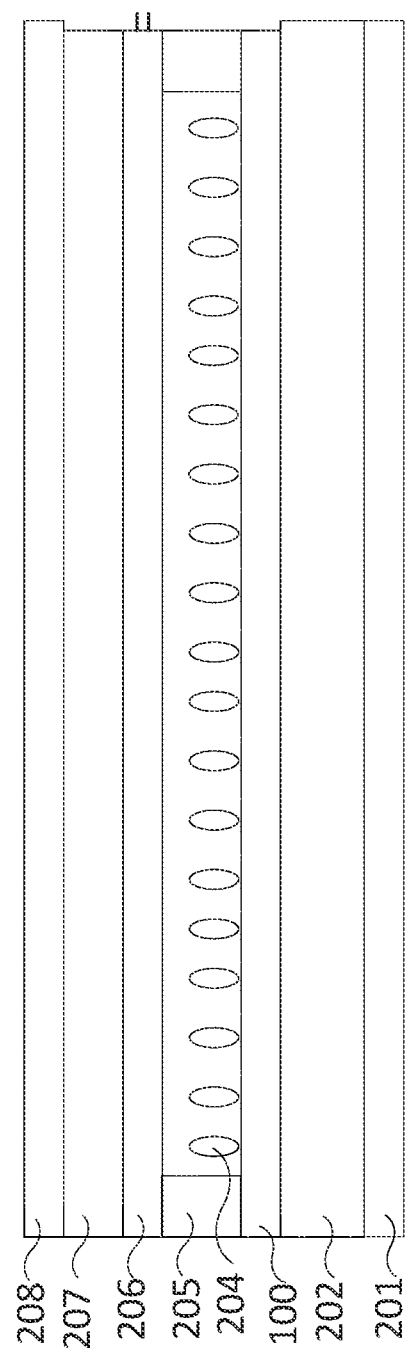
FIG. 7 is a schematic structural diagram of a display panel provided by an embodiment of the present disclosure.

As shown in FIG. 7, the present disclosure also provides a display panel, which includes any one of the pixel units of Embodiments 1-4 or combinations thereof.

Still referring to FIG. 7, the display panel is a liquid crystal display panel, and the cross-sectional structure of the display panel includes: a first substrate 202, a second substrate 207, and liquid crystals 204.

The pixel electrode is formed between the first substrate 202 and the liquid crystals 204, and the second substrate 207 is disposed opposite to the first substrate 202 and maintains a first spacing from the first substrate 202. The liquid crystals 204 are located between the first substrate 202 and the second substrate 207, and twist angles of the liquid crystals 204 are greater than or equal to 50° and less than or equal to 90°.

The liquid crystals 204 are doped with a chiral agent to improve the transmittance of the display panel. The first spacing is greater than or equal to 2 microns and less than or equal to 5 microns; the pitch p of the liquid crystals 204 is greater than or equal to 5 microns and less than or equal to 25 microns; and the optical path difference And of the liquid crystals 204 is greater than or equal to 300 nm and less than or equal to 600 nm, to ensure that the twist angles of the liquid crystals 204 are equal to or equal to 50° and less than or equal to 90°.

Further, the first spacing is greater than or equal to 2.8 microns and less than or equal to 4 microns; the pitch p of the liquid crystals 204 is greater than or equal to 10 microns and less than or equal to 20 microns; and the optical path difference And of the liquid crystals 204 is greater than or equal to 400 nm and less than or equal to 500 nm.

The liquid crystals 204 are injected between the first substrate 202 and the second substrate 207 in a manner such as an integrated cell. After the first substrate 202 and the second substrate 207 are bonded to each other to form a liquid crystal cell, polymerization is adopted, the liquid crystal cell is processed using a polymer stabilized vertical alignment (PSVA), so that the liquid crystals 204 form pretilt angles to obtain the display panel. The PSVA process refers to irradiating the liquid crystal cell with ultraviolet light under a power-on condition, so that the liquid crystals 204 tilt in a certain direction, followed by irradiating polymerizable monomers in the liquid crystals 204 with ultraviolet light to form certain pretilt angles.

In an embodiment, the first substrate 202 further includes a thin film transistor, an alignment layer, and other parts that are not shown.

A color resist layer 206 is provided between the second substrate 207 and the liquid crystals 204, and further, an alignment layer and other parts are not shown.

The display panel further includes: a sealant 205 located between the first substrate 202 and the second substrate 207; a first polarizer 201 located on a side of the first substrate 202 away from the second substrate 207; and a second polarizer 208 located on a side of the second substrate 207 away from the first substrate 202.

The present application also provides a display device including the display panel described above.

The display device further includes a touch panel, which is combined with the display panel in a built-in or plug-in manner to realize the touch function of the display device.

Embodiments of the present application provide a display panel and a display device which adopt a large angle design in an included angle between a fourth sub-pixel electrode branch and a left side of a lower frame electrode of a sub-pixel frame electrode in the sub-pixel electrodes, wherein the angle ranges from 90 degrees to 120 degrees, so that concentrated dark lines in the bottom area of the sub-pixel electrode 120 can be prevented.

It should be pointed out that for the fully explained present disclosure, there can also be various alternative and modified embodiments, which are not limited to the above-mentioned specific embodiments. The above-mentioned embodiments are merely illustrative of the present disclosure, rather than limiting the present disclosure. In short, the protection scope of the present disclosure should include those alterations or substitutions and modifications that are obvious to those of ordinary skill in the art.

What is claimed is:

1. A pixel unit, comprising a main pixel area and a sub-pixel area, wherein the main pixel area comprises a main pixel electrode, and the sub-pixel area comprises:

a sub-pixel electrode having at least one domain, wherein the sub-pixel electrode comprises:
a sub-pixel frame electrode disposed at an edge of the sub-pixel electrode;
a first sub-pixel electrode trunk and a second sub-pixel electrode trunk that are perpendicular to each other; and
a plurality of sub-pixel electrode branches extending from the first sub-pixel electrode trunk and the second sub-pixel electrode trunk to the sub-pixel frame electrode; and the sub-pixel electrode branches comprise a first sub-pixel electrode branch, a second sub-pixel electrode branch, a third sub-pixel electrode branch, and a fourth sub-pixel electrode branch,
wherein the first sub-pixel electrode trunk, the second sub-pixel electrode trunk, and the sub-pixel frame electrode divide the sub-pixel area into a first partition, a second partition, a third partition, and a fourth partition; the first partition is provided with the first sub-pixel electrode branch, the second partition is provided with the second sub- pixel electrode branch, the third partition is provided with the third sub-pixel electrode branch, and the fourth partition is provided with the fourth sub-pixel electrode branch, and the fourth partition is located in a lower right area of the sub-pixel area; and an included angle between the fourth sub-pixel electrode branch and a left side of a lower frame electrode of the sub-pixel frame electrode is an obtuse angle;
wherein the fourth sub-pixel electrode branch and the third sub-pixel electrode branch are arranged parallel to each other;
wherein the first sub-pixel electrode branch and the second sub-pixel electrode branch are perpendicular to each other; and the second sub-pixel electrode branch and the third sub-pixel electrode branch are parallel to each other; or
wherein the first sub-pixel electrode branch and the second sub-pixel electrode branch are perpendicular to each other; and the first sub-pixel electrode branch and the third sub-pixel electrode branch are parallel to each other; or
wherein the first sub-pixel electrode branch and the second sub-pixel electrode branch are parallel to each other; and the first sub-pixel electrode branch and the third sub-pixel electrode branch are parallel to each other.

2. The pixel unit according to claim 1, wherein the obtuse angle ranges from 90 degrees to 120 degrees.

3. The pixel unit according to claim 1, wherein the main pixel electrode comprises:
a main pixel frame electrode disposed at an edge of the main pixel electrode;
a first main pixel electrode trunk and a second main pixel electrode trunk that are orthogonal to each other; and
a plurality of main pixel electrode branches extending from the first main pixel electrode trunk and the second main pixel electrode trunk to the main pixel frame electrode,
wherein the first main pixel electrode trunk, the second main pixel electrode trunk, and the main pixel frame electrode divide the main pixel electrode into a first partition, a second partition, a third partition, and a fourth partition; the first partition is provided with a first main pixel electrode branch, the second partition is provided with a second main pixel electrode branch, the third partition is provided with a third main pixel electrode branch, and the fourth partition is provided with a fourth main pixel electrode branch; the first main pixel electrode branch and the second main pixel electrode branch are perpendicular to each other; the third main pixel electrode branch and the fourth main pixel electrode branch are perpendicular to each other; the first main pixel electrode branch and the third main pixel electrode branch are perpendicular to each other; and the second main pixel electrode branch and the fourth main pixel electrode branch are perpendicular to each other.

4. A pixel unit, comprising a main pixel area and a sub-pixel area surrounding the main pixel area, wherein the main pixel area comprises a main pixel electrode, the main pixel electrode comprises a first main pixel electrode trunk and a second main pixel electrode trunk that are orthogonal to each other, and the sub-pixel area comprises:
a sub-pixel electrode, wherein the main pixel electrode is embedded in the sub- pixel electrode; and the sub-pixel electrode comprises a sub-pixel frame electrode disposed at an edge of the sub-pixel electrode; and a plurality of sub-pixel electrode branches, wherein a shaped slit is provided between the main pixel electrode and the sub-pixel electrode;
wherein the first main pixel electrode trunk and the second main pixel electrode trunk divide the sub-pixel electrode and the sub-pixel area into a first partition, a second partition, a third partition, and a fourth partition, the first partition is provided with a first sub-pixel electrode branch, the second partition is provided with a second sub-pixel electrode branch, the third partition is provided with a third sub-pixel electrode branch, and the fourth partition is provided with a fourth sub-pixel electrode branch; the fourth partition is located in a lower right area of the pixel unit, and an included angle between the fourth sub-pixel electrode branch and a left side of a lower frame electrode of the sub-pixel frame electrode is an obtuse angle;
wherein the first sub-pixel electrode branch and the second sub-pixel electrode branch are parallel to each other; and the first sub-pixel electrode branch and the third sub-pixel electrode branch are parallel to each other.

5. The pixel unit according to claim 4, wherein the obtuse angle ranges from 90 degrees to 120 degrees.

* * * * *